United States Patent Office.

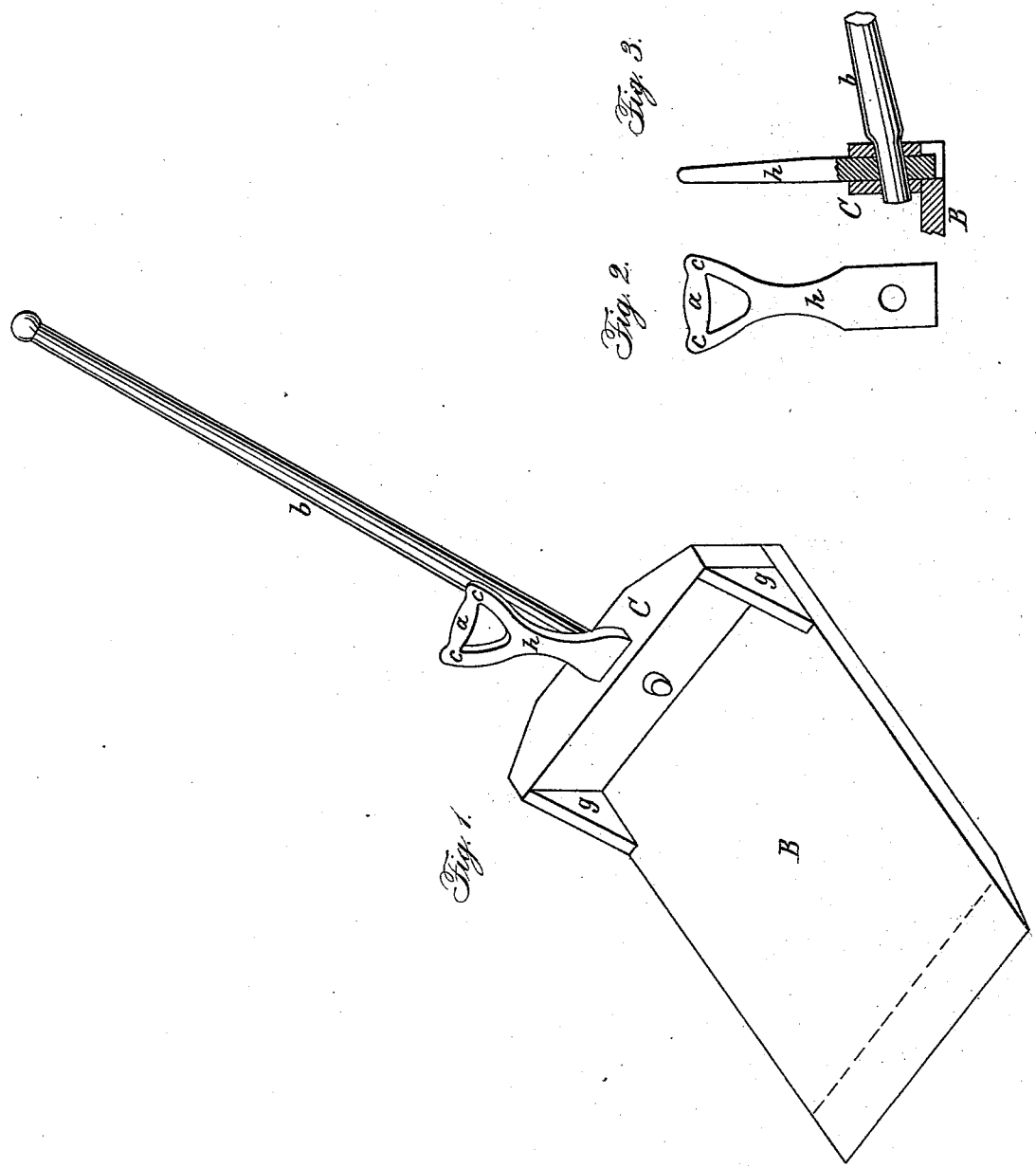

JAMES E. WHEAT, OF ROCHESTER, NEW YORK, ASSIGNOR TO HIMSELF AND OTIS COLE.

*Letters Patent No. 61,784, dated February 5, 1867.*

IMPROVEMENT IN SNOW SHOVEL.

*The Schedule referred to in these Letters Patent and making part of the same.*

TO ALL WHOM IT MAY CONCERN:

Be it known that I, JAMES E. WHEAT, of Rochester, in the county of Monroe, and State of New York, have invented a new and useful "Snow Shovel;" and I do hereby declare that the following is a full, clear, and exact description thereof, reference being had to the accompanying drawings, making part of this specification, in which—

Figure 1 is a perspective view of my invention.

Figure 2 is a detached view of the short secondary or auxiliary handle $h$, which is locked to the body of the shovel by means of the ordinary handle $b$.

Figure 3 is a sectional view, showing the manner of attaching the handles $h$ and $b$.

The handles of snow shovels, as heretofore constructed, being round, and the blades necessarily wide and long, cause great inconvenience and labor in manipulating the shovels, owing to the great tendency to roll over, or turn in the hand. The shovels are also very bulky or cumbersome to ship or transport. The object of this invention is to meet these objections with a cheap and efficient device, and its nature consists in providing the ordinary shovel with a sort of auxiliary handle running up at right angles, or nearly so, from the blade to which it is securely attached by the end being inserted in a mortise in the cross-bar of the blade, and the end of the handle proper being inserted in a hole bored through them both.

To enable others to make and use my invention, I will describe its construction and operation.

The blade B may be made somewhat longer than for the ordinary shovel, and the cross-bar C a little larger. This bar is mortised to receive the end of the short auxiliary handle $h$, which is made of any suitable material, and it may be shaped about as shown in fig. 2. That portion, $a$, to be grasped in the hand may be formed from the same piece, if desired, or there may be a turned handle substituted for that, and attached to the points $e$ by screws or otherwise. This handle $h$ is then placed in the mortise in the cross-bar C, and a hole bored through both to receive the handle $b$ at any desired angle. There may be light angle blocks, $g$, used to support the connection of the cross-bar and blade. These angle-blocks or brackets may be made of wood or metal, and when they are employed, a lighter cross-bar may be used. It might be found desirable to substitute a swinging bail for the handle $h$, which would be pivoted to the angle-blocks. If the latter were made of metal, the holes to receive the ends of the bail would be cast in. The edge of the blade may be protected by the ordinary metal sheathing. The handle $h$, and even the cross-bar C, may be made of cast iron, or other suitable metal, and connected together in a similar manner to that herein shown. Both handles, $b$ and $h$, should be removed when the shovels are to be packed for transportation. The character of this invention may be applied to shovels for moving grain, meal, or any other substances.

What I claim as my invention, and desire to secure by Letters Patent, is—

The combination of the auxiliary handle $h$ with the blade B and handle $b$, substantially as herein shown and described.

JAMES E. WHEAT.

Witnesses:
WM. S. LOUGHBOROUGH,
A. H. BILLINGS.